United States Patent
Hakeem et al.

(10) Patent No.: US 9,394,843 B2
(45) Date of Patent: Jul. 19, 2016

(54) METHOD FOR REDUCING ENGINE OIL DILUTION

(71) Applicant: Ford Global Technologies, LLC, Dearborn, MI (US)

(72) Inventors: Mohannad Hakeem, Dearborn, MI (US); Shuya Shark Yamada, Novi, MI (US); Gopichandra Surnilla, West Bloomfield, MI (US); James Eric Anderson, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 123 days.

(21) Appl. No.: 14/512,318

(22) Filed: Oct. 10, 2014

(65) Prior Publication Data

US 2016/0102623 A1    Apr. 14, 2016

(51) Int. Cl.
*F02D 41/00* (2006.01)
*F02B 37/00* (2006.01)
*F02D 41/06* (2006.01)
*F02D 41/22* (2006.01)

(52) U.S. Cl.
CPC .......... *F02D 41/064* (2013.01); *F02D 41/0007* (2013.01); *F02D 41/22* (2013.01)

(58) Field of Classification Search
CPC ..... F02D 41/00; F02D 41/062; F02D 41/064; F02D 41/0065; F02D 23/02; F02B 37/00; F02B 37/12; F02B 37/16; F02B 37/007; Y02T 10/123; Y02T 10/144; Y02T 10/47
See application file for complete search history.

(56) References Cited

U.S. PATENT DOCUMENTS

| | | | |
|---|---|---|---|
| 5,033,268 A * | 7/1991 | Hitomi | F02B 27/02 123/184.53 |
| 5,542,401 A | 8/1996 | Newarski | |
| 7,100,587 B2 | 9/2006 | Ahlborn et al. | |
| 7,305,828 B2 * | 12/2007 | Todoroki | F02M 26/48 123/562 |
| 8,001,778 B2 * | 8/2011 | Sun | F02B 37/16 123/568.11 |
| 8,151,775 B2 | 4/2012 | Kim et al. | |
| 8,726,855 B2 | 5/2014 | Ingelfinger et al. | |
| 9,181,861 B2 * | 11/2015 | Kashiwagi | F02B 37/12 |
| 2013/0333665 A1 | 12/2013 | Pursifull | |
| 2014/0058647 A1 | 2/2014 | Haladyna et al. | |

OTHER PUBLICATIONS

Hakeem, Mohannad et al., "Methods and Systems for Determining a Fuel Concentration in Engine Oil Using an Intake Oxygen Sensor," U.S. Appl. No. 14/252,679, filed Apr. 14, 2014, 63 pages.
Surnilla, Gopichandra et al., "Methods and Systems for Adjusting EGR Based on an Impact of PCV Hydrocarbons on an Intake Oxygen Sensor," U.S. Appl. No. 14/252,693, filed Apr. 14, 2014, 63 pages.
Lehmen, Allen et al., "System and Method for Reducing Engine Oil Dilution," U.S. Appl. No. 14/308,051, filed Jun. 18, 2014, 45 pages.

* cited by examiner

*Primary Examiner* — Hieu T Vo
(74) *Attorney, Agent, or Firm* — Julia Voutyras; Alleman Hall McCoy Russell & Tuttle LLP

(57) ABSTRACT

Various systems and methods are described for reducing engine oil dilution in a boosted engine. One method comprises, when engine oil dilution is higher than a first threshold and engine oil temperature is below a temperature threshold, adjusting a position of an air induction system (AIS) throttle, generating a vacuum, and providing the vacuum to a crankcase of the boosted engine to enhance fuel evaporation from engine oil. The providing of vacuum may be discontinued when engine oil dilution is lower than the first threshold and/or when engine oil temperature rises above the temperature threshold.

20 Claims, 4 Drawing Sheets

METHOD FOR REDUCING ENGINE OIL DILUTION

TECHNICAL FIELD

The present application relates to engine oil dilution and methods for reducing the same.

BACKGROUND AND SUMMARY

During cold engine operation, including cold engine starts and shorter drive cycles in colder climates, an engine may not reach stable engine operating conditions leading to fuel dilution in engine oil. For example, fuel may mix with engine oil in an engine's crankcase. Repeated cold start engine operation without completing engine warm-up may result in excessive fuel dilution and degradation of oil quality. Further, this can cause oil overfill conditions which in turn may generate fuel odors perceptible to a vehicle operator. Excessive fuel in the oil may also decrease engine durability and affect engine performance.

In general, as engine temperature increases, fuel diluted in engine oil may be burned off. An example of the above approach is shown by Haladyna et al. in US 2014/0058647. The example approach includes starting and operating an engine in a hybrid vehicle when engine oil dilution is determined to be more than a threshold amount. Further, the engine may be operated for a given duration until a target engine temperature is attained promoting evaporation of fuel from engine oil.

However, the inventors herein have identified potential issues with the above example approach. As an example, vehicles (whether hybrid or not) may not experience long enough drive cycles for engine temperatures to warm up to the target temperature enabling fuel evaporation. Further, the engine may have to be operated for longer durations in colder ambient conditions to reach the target temperature leading to a significant increase in fuel consumption. Consequently, fuel economy of the vehicle may be considerably decreased.

The inventors herein have recognized the above issues and identified an approach to at least partly address the above issues. In one example approach, a method for a boosted engine comprises, when engine oil dilution is higher than a first threshold and engine oil temperature is below a temperature threshold, adjusting a position of an air induction system (AIS) throttle, generating a vacuum, and applying the vacuum to a crankcase to enhance fuel evaporation from engine oil. In this way, engine oil dilution may be lowered even during shorter drive cycles.

For example, when a boosted engine is cold started, oil dilution in a crankcase of the boosted engine may be determined to be higher than a first threshold. Further, evaporation of fuel from engine oil may be inhibited at the cold start as engine oil temperature may be below a temperature threshold. As such, the temperature threshold may be a boiling point of fuel diluted in the engine oil. An air induction system (AIS) throttle positioned in an intake passage upstream of a compressor in the boosted engine may be adjusted to a more closed position when engine oil dilution is greater than the first threshold and engine oil temperature is below the temperature threshold. The adjustment of the AIS throttle may be based on engine operating conditions. As an example, the AIS throttle may be closed only if a desired engine performance is met. For example, if engine torque demand is increasing, the adjustment to the AIS throttle may not be performed. By adjusting the AIS throttle to the more closed position, vacuum may be generated in the intake passage and this vacuum may be provided to the crankcase. As a result, pressure within the crankcase may be reduced enabling vaporization of fuel dissolved in the engine oil. If engine oil temperature increases beyond the temperature threshold, the AIS throttle may be adjusted to a more open position. Further, if engine oil dilution decreases below the first threshold, the AIS throttle may be opened and provision of vacuum to the crankcase may be stopped. Further still, if pressure within the crankcase reduces below a pressure threshold, the AIS throttle may be adjusted to a more open position and pressure within the crankcase may be increased.

In this way, engine oil dilution may be decreased without relying on increasing the engine oil temperature. By reducing pressure within the crankcase, a boiling point of fuel may be decreased accelerating the evaporation of fuel from engine oil. Further, vacuum generated by closing the AIS throttle may advantageously purge a headspace in the crankcase of evaporated fuel vapors. By allowing an adjustment to the AIS throttle only when engine operating conditions permit a reduced airflow, engine performance may be maintained. Overall, durability of the engine may be improved without degrading fuel economy.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
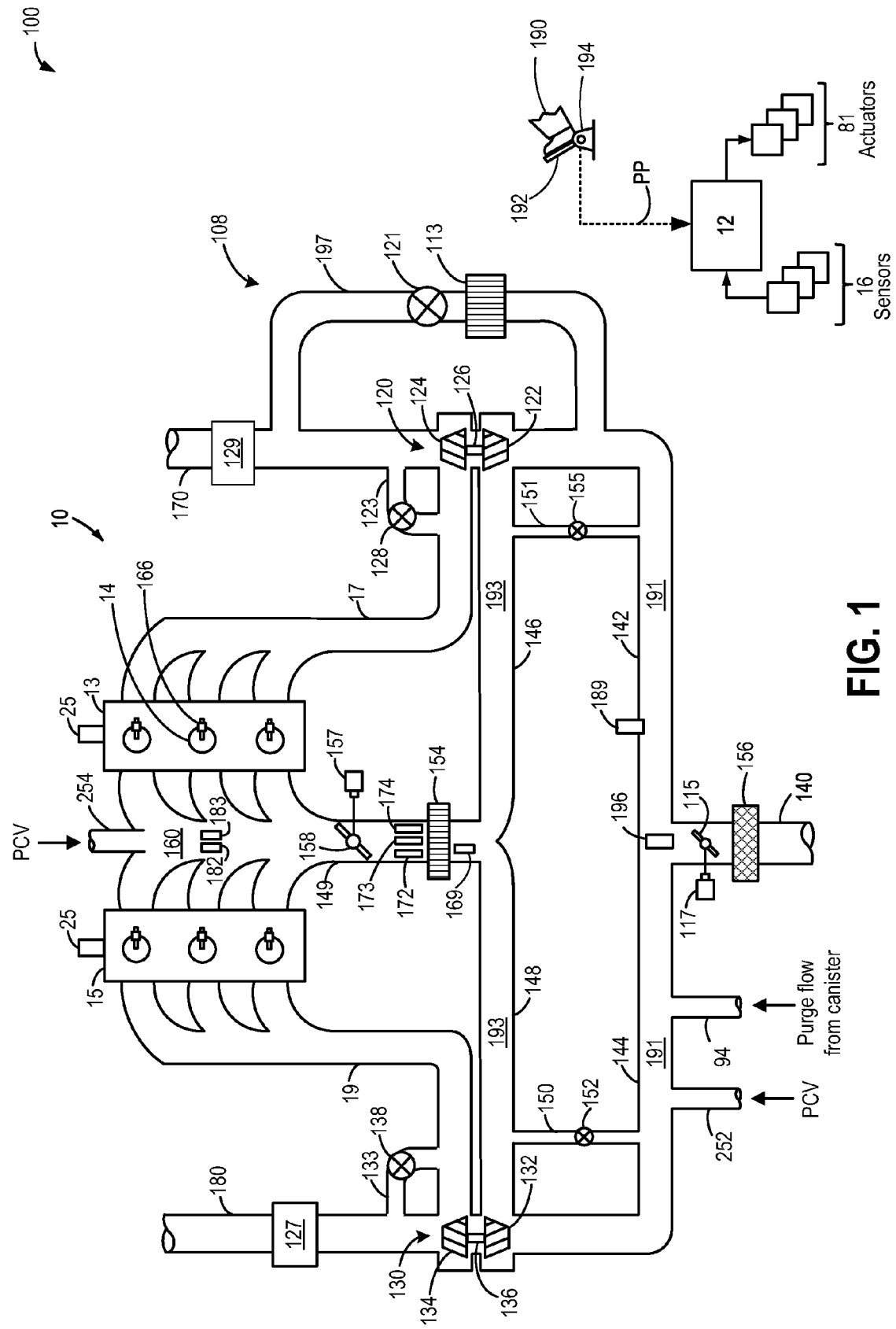
FIGS. 1 and 2 are schematic diagrams of an engine system.
Figure 2:
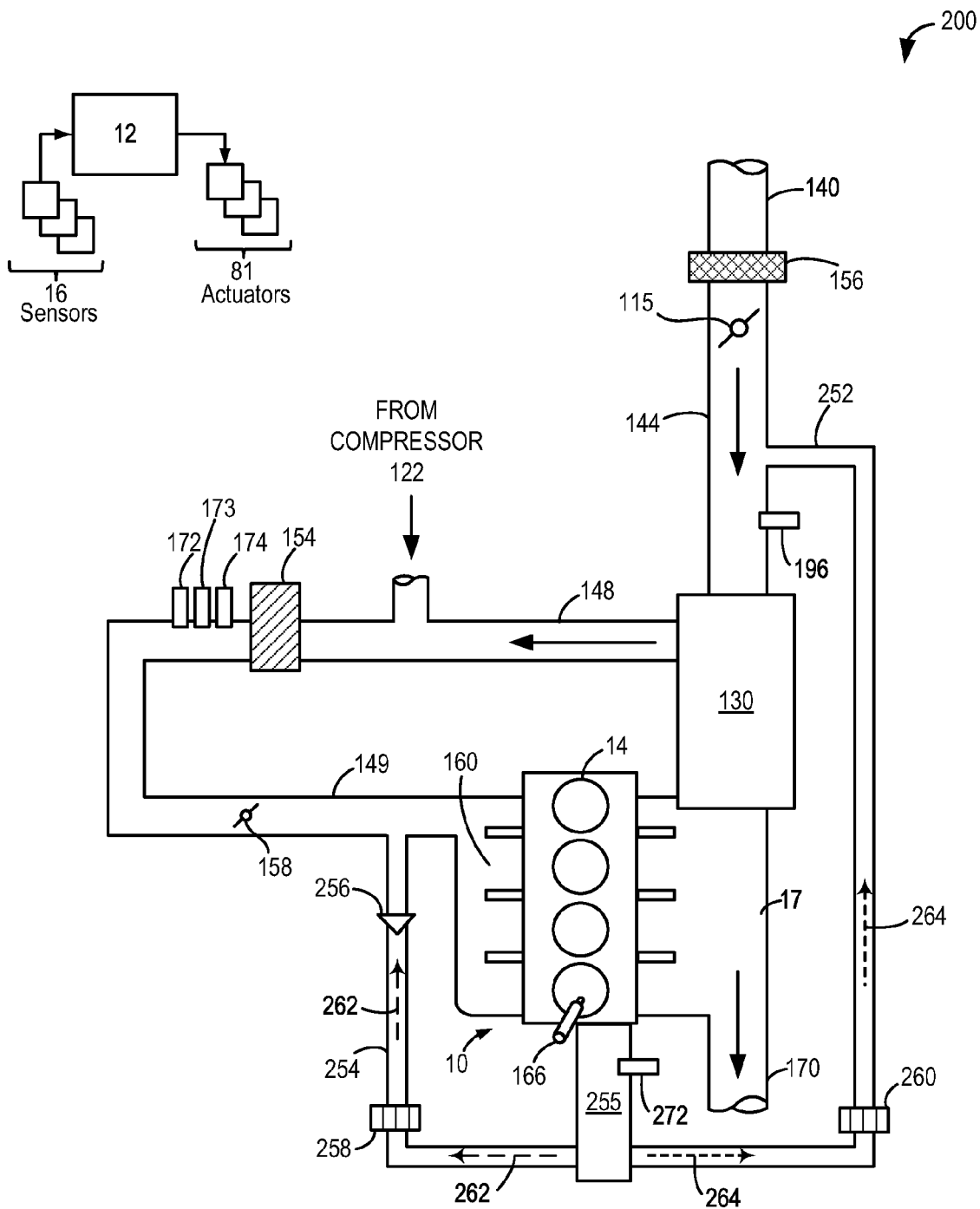
Figure 3:
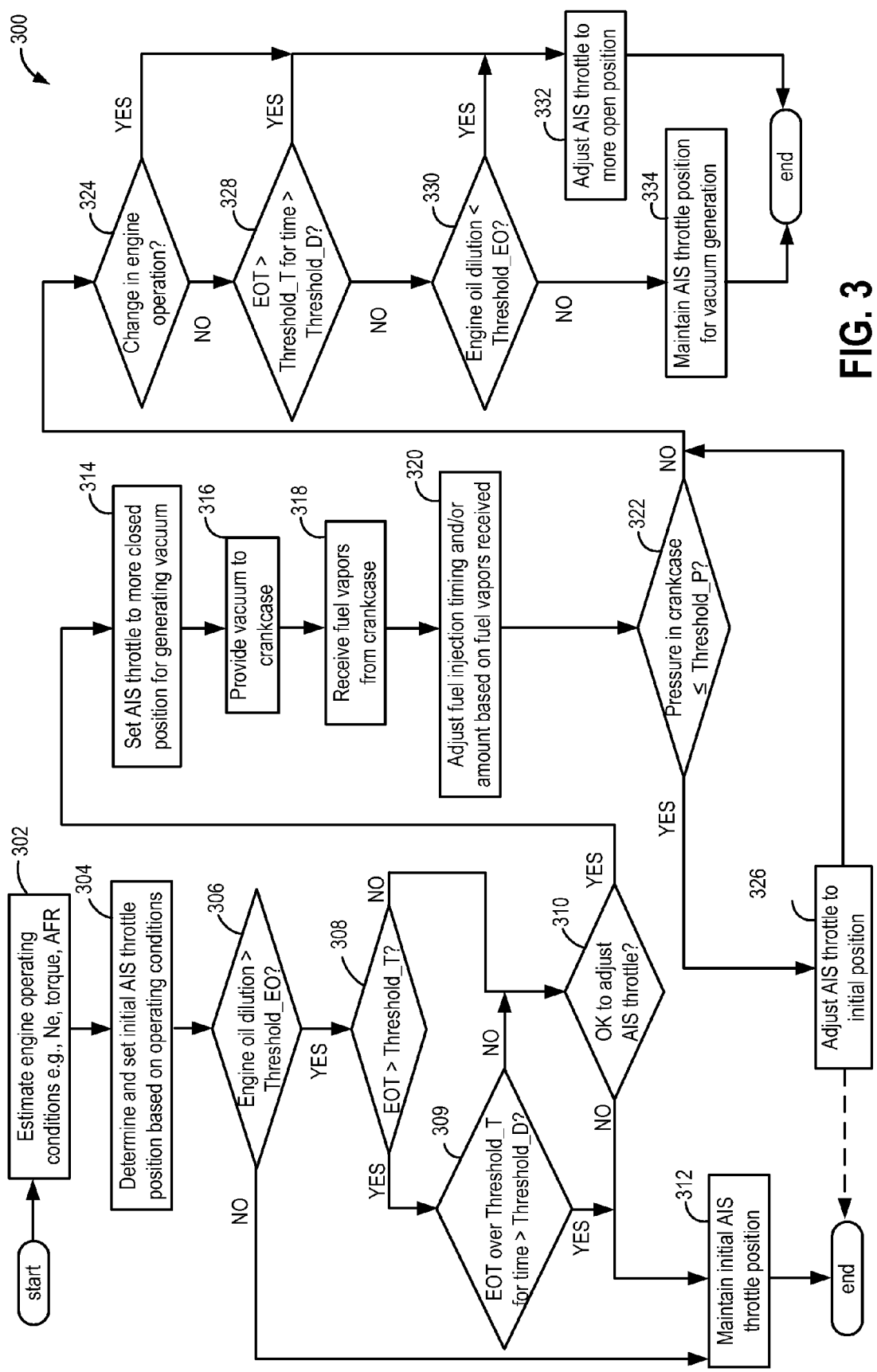
FIG. 3 portrays an example flow chart for adjusting a position of an air induction system (AIS) throttle based on engine oil dilution, engine oil temperature, and other engine conditions.
Figure 4:
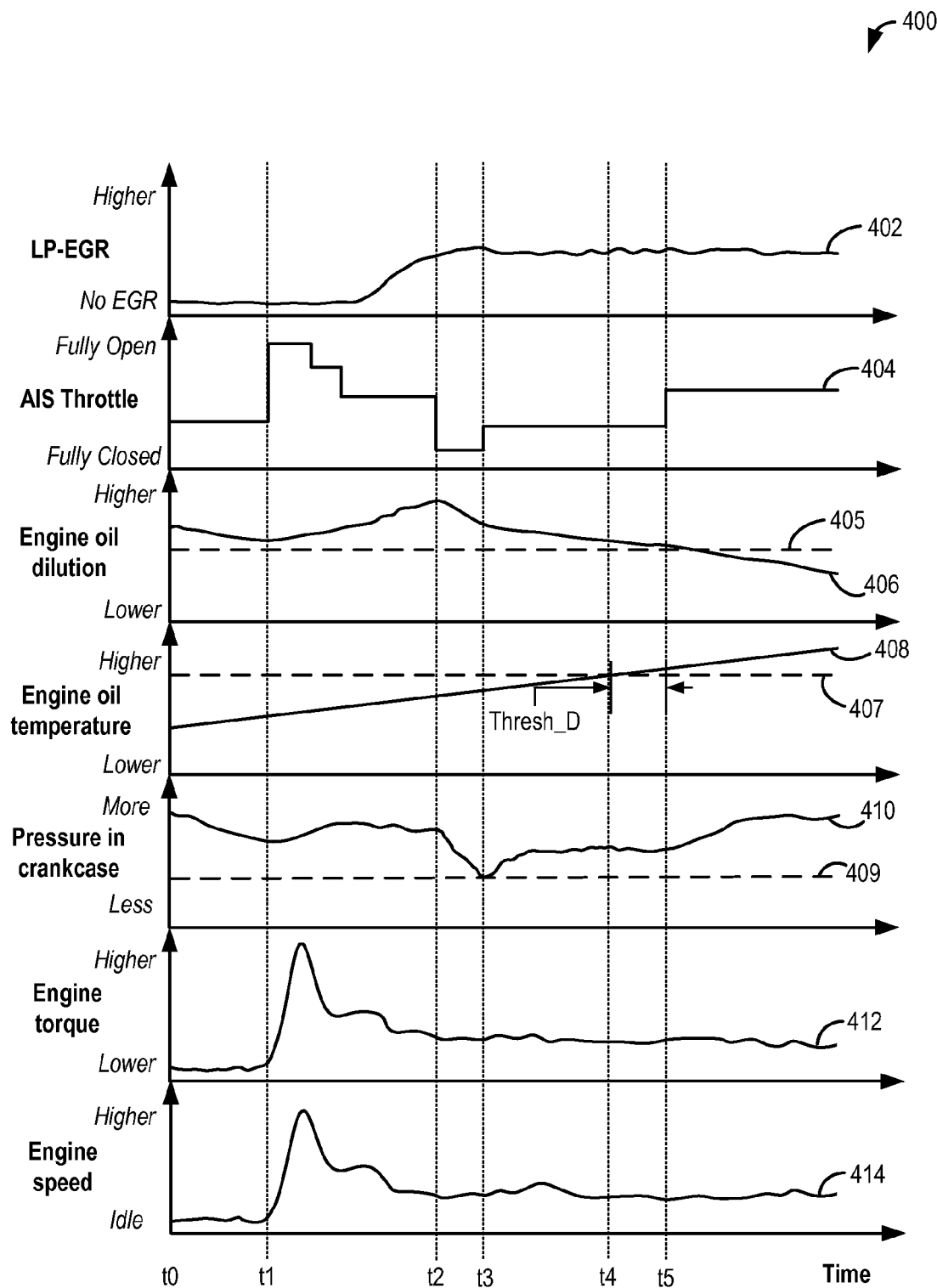
FIG. 4 depicts a graph of example adjustments to the AIS throttle to reduce engine oil dilution, in accordance with the present disclosure.

The following description relates to systems and methods for improving evaporation of fuel diluted in engine oil within a crankcase of an engine system, such as the engine system of FIGS. 1 and 2. A position of an air induction system (AIS) throttle positioned upstream of a compressor in a turbocharger system may be adjusted to generate a vacuum. Further, the vacuum may be provided to the crankcase in the engine enabling a faster evaporation of fuel diluted within the engine oil. Adjustments to the position of the AIS throttle may be based upon an amount of engine oil dilution being higher than a first threshold while engine oil temperature is below a temperature threshold (FIG. 3). The position of the AIS throttle may be further adjusted responsive to changes in engine operating conditions such as torque demand, pressure in the crankcase, etc. (FIG. 4). In this way, the AIS throttle may be used to improve fuel evaporation from engine oil prior to a completion of engine warm-up.

FIG. 1 shows a schematic depiction of an example turbocharged engine system 100 including a multi-cylinder internal combustion engine 10 and twin turbochargers 120 and 130, which may be identical. As one non-limiting example, engine system 100 can be included as part of a propulsion system for a passenger vehicle. While not depicted herein, other engine configurations such as an engine with a single turbocharger may be used without departing from the scope of this disclosure.

Engine system 100 may be controlled at least partially by a controller 12 and by input from a vehicle operator 190 via an input device 192. In this example, input device 192 includes an accelerator pedal and a pedal position sensor 194 for generating a proportional pedal position signal PP. Controller 12 may be a microcomputer including the following: a microprocessor unit, input/output ports, an electronic storage medium for executable programs and calibration values (e.g., a read only memory chip), random access memory, keep alive memory, and a data bus. The storage medium read-only memory may be programmed with computer readable data representing non-transitory instructions executable by the microprocessor for performing the routines described herein as well as other variants that are anticipated but not specifically listed. Controller 12 may be configured to receive information from a plurality of sensors 16 and to send control signals to a plurality of actuators 81 (various examples of which are described herein). Other actuators, such as a variety of additional valves and throttles, may be coupled to various locations in engine system 100.

Engine system 100 may receive intake air via intake passage 140. As shown at FIG. 1, intake passage 140 may include an air filter 156 and an air induction system (AIS) throttle 115. The position of AIS throttle 115 may be adjusted via a throttle actuator 117 communicatively coupled to controller 12.

At least a portion of the intake air may be directed to a compressor 122 of turbocharger 120 via a first branch of the intake passage 140 as indicated at 142 and at least a portion of the intake air may be directed to a compressor 132 of turbocharger 130 via a second branch of the intake passage 140 as indicated at 144. Accordingly, engine system 100 includes a low-pressure AIS system (LP AIS) 191 upstream of compressors 122 and 132, and a high-pressure AIS system (HP AIS) 193 downstream of compressors 122 and 132.

A first positive crankcase ventilation (PCV) conduit 252 (e.g., push-side pipe) may couple a crankcase (not shown) to the second branch 144 of the intake passage such that gases in the crankcase may be vented in a controlled manner from the crankcase. Further, evaporative emissions from a fuel vapor canister (not shown) may be vented into the intake passage through a fuel vapor purge conduit 94 coupling the fuel vapor canister to the second branch 144 of the intake passage.

When engine conditions permit, AIS throttle 115, positioned upstream of compressors 122 and 132, may be moved to a more closed position such that a vacuum is generated by restricting a flow of air into compressors 122 and 132. Further, the position of AIS throttle 115 may be controlled (e.g. closed) to draw a fluid such as PCV flow from the crankcase via PCV conduit 252 positioned intermediate the AIS throttle 115 and an inlet of compressor 132. As such, vacuum generated by throttling intake airflow via closing AIS throttle 115 may be provided to the crankcase and thus, utilized to remove fuel vapors from the crankcase. The PCV flow may be delivered via PCV conduit 252 into second branch 144 of the intake passage. Hereon, the fuel vapors may be conducted to one or both of compressors 122 and 132. Further details will be described in reference to FIGS. 3 and 4.

A first portion of total intake air can be compressed via compressor 122 where it may be supplied to intake manifold 160 via intake air passage 146. Thus, intake passages 142 and 146 form a first branch of the engine's air intake system. Similarly, a second portion of the total intake air can be compressed via compressor 132 where it may be supplied to intake manifold 160 via intake air passage 148. Thus, intake passages 144 and 148 form a second branch of the engine's air intake system. As shown at FIG. 1, intake air from intake passages 146 and 148 can be recombined via a common intake passage 149 before reaching intake manifold 160, where the intake air may be provided to the engine. In some examples, intake manifold 160 may include an intake manifold pressure sensor 182 for estimating a manifold pressure (MAP) and/or an intake manifold temperature sensor 183 for estimating a manifold air temperature (MCT), each communicating with controller 12. In the depicted example, intake passage 149 also includes a charge air cooler (CAC) 154 and a throttle 158. The position of throttle 158 may be adjusted by the control system via a throttle actuator 157 communicatively coupled to controller 12. As shown, throttle 158 may be arranged in intake passage 149 downstream of CAC 154, and may be configured to adjust the flow of an intake gas stream entering engine 10.

As shown at FIG. 1, a compressor bypass valve (CBV) 152 may be arranged in CBV passage 150 and a CBV 155 may be arranged in CBV passage 151. In one example, CBVs 152 and 155 may be electronic pneumatic CBVs (EPCBVs). CBVs 152 and 155 may be controlled to enable release of pressure in the intake system when the engine is boosted. An upstream end of CBV passage 150 may be coupled with intake passage 148 downstream of compressor 132, and a downstream end of CBV passage 150 may be coupled with intake passage 144 upstream of compressor 132. Similarly, an upstream end of a CBV passage 151 may be coupled with intake passage 146 downstream of compressor 122, and a downstream end of CBV passage 151 may be coupled with intake passage 142 upstream of compressor 122. Depending on a position of each CBV, air compressed by the corresponding compressor may be recirculated into the intake passage upstream of the compressor (e.g., second branch 144 of intake passage for compressor 132 and first branch 142 of intake passage for compressor 122). For example, CBV 152 may open to recirculate compressed air upstream of compressor 132 and/or CBV 155 may open to recirculate compressed air upstream of compressor 122 to release pressure in the intake system during selected conditions to reduce the effects of compressor surge loading. CBVs 155 and 152 may be either actively or passively controlled by the control system.

As shown, a compressor inlet pressure (CIP) sensor 196 is arranged in the intake passage 142 and a HP AIS pressure sensor 169 is arranged in intake passage 149. However, in other anticipated embodiments, sensors 196 and 169 may be arranged at other locations within the LP AIS and HP AIS, respectively.

Engine 10 may include a plurality of cylinders 14. In the depicted example, engine 10 includes six cylinders arrange in a V-configuration. Specifically, the six cylinders are arranged on two banks 13 and 15, with each bank including three cylinders. In alternate examples, engine 10 can include two or more cylinders such as 3, 4, 5, 8, 10 or more cylinders. These various cylinders can be equally divided and arranged in alternate configurations, such as V, in-line, boxed, etc. Each cylinder 14 may be configured with a fuel injector 166. In the depicted example, fuel injector 166 is a direct in-cylinder injector. However, in other examples, fuel injector 166 can be configured as a port fuel injector.

Intake air supplied to each cylinder 14 (herein, also referred to as combustion chamber 14) via common intake passage 149 may be used for fuel combustion and products of combustion may then be exhausted via bank-specific exhaust passages. In the depicted example, a first bank 13 of cylinders of engine 10 can exhaust products of combustion via a common exhaust passage 17 and a second bank 15 of cylinders can exhaust products of combustion via a common exhaust passage 19.

The position of intake and exhaust valves of each cylinder 14 may be regulated via hydraulically actuated lifters coupled to valve pushrods, or via mechanical buckets in which cam lobes are used. In this example, at least the intake valves of each cylinder 14 may be controlled by cam actuation using a cam actuation system. Specifically, the intake valve cam actuation system 25 may include one or more cams and may utilize variable cam timing or lift for intake and/or exhaust valves. In alternative embodiments, the intake valves may be controlled by electric valve actuation. Similarly, the exhaust valves may be controlled by cam actuation systems or electric valve actuation. In still another alternative embodiment, the cams may not be adjustable.

A second PCV conduit 254 (e.g., pull-side pipe), also termed a vacuum side PCV conduit 254, may couple the crankcase (not shown) to intake manifold 160. Herein, vacuum in the intake manifold 160 may draw fuel vapors from the crankcase into the cylinders to be combusted.

Products of combustion that are exhausted by engine 10 via exhaust passage 17 can be directed through exhaust turbine 124 of turbocharger 120, which in turn can provide mechanical work to compressor 122 via shaft 126 in order to provide compression to the intake air. Alternatively, some or all of the exhaust gases flowing through exhaust passage 17 can bypass exhaust turbine 124 via turbine bypass passage 123 as controlled by wastegate 128. The position of wastegate 128 may be controlled by an actuator (not shown) as directed by controller 12. As one non-limiting example, controller 12 can adjust the position of the wastegate 128 via pneumatic actuator controlled by a solenoid valve. For example, the solenoid valve may receive a signal for facilitating the actuation of wastegate 128 via the pneumatic actuator based on the difference in air pressures between intake passage 142 arranged upstream of compressor 122 and intake passage 149 arranged downstream of compressor 122. In other examples, other suitable approaches other than a solenoid valve may be used for actuating wastegate 128.

Similarly, products of combustion that are exhausted by engine 10 via exhaust passage 19 can be directed through exhaust turbine 134 of turbocharger 130, which in turn can provide mechanical work to compressor 132 via shaft 136 in order to provide compression to intake air flowing through the second branch of the engine's intake system. Alternatively, some or all of the exhaust gases flowing through exhaust passage 19 can bypass exhaust turbine 134 via turbine bypass passage 133 as controlled by wastegate 138. The position of wastegate 138 may be controlled by an actuator (not shown) as directed by controller 12. As one non-limiting example, controller 12 can adjust the position of wastegate 138 via a solenoid valve controlling a pneumatic actuator. For example, the solenoid valve may receive a signal for facilitating the actuation of wastegate 138 via the pneumatic actuator based on the difference in air pressures between intake passage 144 arranged upstream of compressor 132 and intake passage 149 arranged downstream of compressor 132. In other examples, other suitable approaches other than a solenoid valve may be used for actuating wastegate 138.

In some examples, exhaust turbines 124 and 134 may be configured as variable geometry turbines, wherein controller 12 may adjust the position of the turbine impeller blades (or vanes) to vary the level of energy that is obtained from the exhaust gas flow and imparted to their respective compressor. Alternatively, exhaust turbines 124 and 134 may be configured as variable nozzle turbines, wherein controller 12 may adjust the position of the turbine nozzle to vary the level of energy that is obtained from the exhaust gas flow and imparted to their respective compressor. For example, the control system can be configured to independently vary the vane or nozzle position of the exhaust turbines 124 and 134 via respective actuators.

Products of combustion exhausted by the cylinders via exhaust passage 19 may be directed to the atmosphere via exhaust passage 180 downstream of exhaust turbine 134, while combustion products exhausted via exhaust passage 17 may be directed to the atmosphere via exhaust passage 170 downstream of turbine 124. Exhaust passages 170 and 180 may include one or more exhaust after-treatment devices, such as a catalyst, and one or more exhaust gas sensors. For example, as shown at FIG. 1, exhaust passage 170 may include an emission control device 129 arranged downstream of exhaust turbine 124, and exhaust passage 180 may include an emission control device 127 arranged downstream of exhaust turbine 134. Emission control devices 127 and 129 may be selective catalytic reduction (SCR) devices, three way catalysts (TWC), $NO_x$ traps, various other emission control devices, or combinations thereof. Further, in some embodiments, during operation of the engine 10, emission control devices 127 and 129 may be periodically regenerated by operating at least one cylinder of the engine within a particular air/fuel ratio, for example.

Engine system 100 may further include one or more exhaust gas recirculation (EGR) systems for recirculating at least a portion of exhaust gas from the exhaust manifold to the intake manifold. These may include one or more high-pressure EGR systems for proving high pressure EGR (HP-EGR) and one or more low-pressure EGR-loops for providing low pressure EGR (LP-EGR). In one example, HP-EGR may be provided in the absence of boost provided by turbochargers 120, 130, while LP-EGR may be provided in the presence of turbocharger boost and/or when exhaust gas temperature is above a threshold. In still other examples, both HP-EGR and LP-EGR may be provided simultaneously.

In the depicted example, engine system 100 may include a low-pressure (LP) EGR system 108. LP-EGR system 108 routes a desired portion of exhaust gas from exhaust passage 170 to intake passage 142. In the depicted embodiment, EGR is routed in an EGR passage 197 from downstream of exhaust turbine 124 to intake passage 142 at a mixing point located upstream of compressor 122. The amount of EGR provided to intake passage 142 may be varied by the controller 12 via EGR valve 121 coupled in the LP-EGR system 108. In the example embodiment shown at FIG. 1, LP-EGR system 108 includes an EGR cooler 113 positioned downstream of EGR valve 121. EGR cooler 113 may reject heat from the recirculated exhaust gas to engine coolant, for example. The LP-EGR system may also include a differential pressure over valve (DPOV) sensor (not shown). In one example, an EGR flow rate may be estimated based on the DPOV system which includes the DPOV sensor that detects a pressure difference between an upstream region of the EGR valve 121 and a downstream region of EGR valve 121. In another example, EGR flow rate may be determined based on outputs from an EGR measurement system that includes an intake oxygen sensor 172, mass air flow sensor (not shown), manifold absolute pressure (MAP) sensor 182 and manifold temperature sensor 183. In some examples, both the EGR measurement systems (that is, the DPOV system and the EGR measurement system including intake oxygen sensor 172) may be used to determine, monitor and adjust EGR flow rate.

In an alternate embodiment, the engine system may include a second LP-EGR system (not shown) that routes a desired portion of exhaust gas from exhaust passage 180 to second branch 144 of the intake passage. In another alternate embodiment, the engine system may include both the LP-EGR systems (one routing exhaust gas from exhaust passage 180 to intake passage 144, and another routing exhaust gas from exhaust passage 170 to intake passage 142) described above. In yet another alternate embodiment, a HP EGR system may also be included, without departing from the scope of this disclosure.

EGR valve 121 may be configured to adjust an amount and/or rate of exhaust gas diverted through the EGR passage to achieve a desired EGR dilution percentage of the intake charge entering the engine. In addition to the position of the EGR valve 121, it will be appreciated that AIS throttle position of the AIS throttle 115, and other actuators may also affect the EGR dilution percentage of the intake charge. As an example, AIS throttle position may increase the pressure drop over the LP-EGR system, allowing more flow of LP-EGR into the intake system. Accordingly, EGR dilution of the intake charge may be controlled via control of one or more of EGR valve position and AIS throttle position among other parameters. Thus, adjusting one or more of the EGR valve 121 and the AIS throttle 115 may adjust EGR flow amount (or rate) and subsequently a percentage EGR in the mass air flow (e.g., air charge entering the intake manifold).

The engine 10 may further include one or more oxygen sensors positioned in the common intake passage 149. As such, the one or more oxygen sensors may be referred to as intake oxygen sensors. In the depicted embodiment, an intake oxygen sensor 172 is positioned upstream of throttle 158 and downstream of CAC 154. However, in other embodiments, intake oxygen sensor 172 may be arranged at another location along intake passage 149, such as upstream of the CAC 154. Intake oxygen sensor (IAO2) 172 may be any suitable sensor for providing an indication of the oxygen concentration of the intake charge air (e.g., air flowing through the common intake passage 149), such as a linear oxygen sensor, intake UEGO (universal or wide-range exhaust gas oxygen) sensor, two-state oxygen sensor, etc. In one example, the intake oxygen sensor 172 may be an intake oxygen sensor including a heated element as the measuring element. During operation, a pumping current of the intake oxygen sensor may be indicative of an amount of oxygen in the gas flow.

As such, IAO2 172 may be used to determine engine oil dilution based on a level of PCV flow received from the crankcase especially when the engine is boosted and EGR flow and purge flow from a fuel vapor canister are not enabled. Hydrocarbons received from PCV flow may react with ambient oxygen at the sensing element of the IAO2 172. This reduces the (local) oxygen concentration read by the IAO2 172. Accordingly, the change in oxygen concentration may indicate a level of hydrocarbons received from the crankcase particularly when EGR flow and purge flow from the fuel vapor canister are not received in the intake.

A pressure sensor 173 may be positioned alongside the IAO2 172 for estimating an intake pressure at which an output of the oxygen sensor is received. Since the output of the oxygen sensor is influenced by the intake pressure, a reference oxygen sensor output may be learned at a reference intake pressure. In one example, the reference intake pressure is a throttle inlet pressure (TIP) where pressure sensor 173 is a TIP sensor. In alternate examples, the reference intake pressure is a manifold pressure (MAP) as sensed by MAP sensor 182.

Engine system 100 may include various sensors 16, in addition to those mentioned above. As shown in FIG. 1, common intake passage 149 may include a throttle inlet temperature sensor 174 for estimating a throttle air temperature (TCT). Further, while not depicted herein, each of intake passages 142 and 144 may include a mass air flow sensor or alternatively the mass air flow sensor can be located in common intake passage 140.

Humidity sensor 189 may be included in only one of the parallel intake passages. As shown in FIG. 1, the humidity sensor 189 is positioned in the intake passage 142 (e.g., non PCV and non-purge bank of the intake passage), upstream of the CAC 154 and an outlet of the LP EGR passage 197 into the intake passage 142 (e.g., junction between the LP EGR passage 197 and the intake passage 142 where LP EGR enters the intake passage 142). Humidity sensor 189 may be configured to estimate a relative humidity of the intake air. In one embodiment, humidity sensor 189 is a UEGO sensor configured to estimate the relative humidity of the intake air based on the output of the sensor at one or more voltages. Since purge air and PCV air can confound the results of the humidity sensor, the purge port and PCV port are positioned in a distinct intake passage from the humidity sensor.

Controller 12 is shown receiving information from a plurality of sensors 16 (various examples of which have been described earlier) and sending control signals to a plurality of actuators 81. Actuators 81 may include fuel injector(s) 166, AIS throttle 115, throttle 158, CBVs 152 and 155, and EGR valve 121. Controller 12 may receive input data from the various sensors, process the input data, and trigger the actuators in response to the processed input data based on instruction or code programmed therein corresponding to one or more routines. An example control routine is described herein at FIG. 3.

Now turning to FIG. 2, another example embodiment 200 of the engine of FIG. 1 is shown. As such, components previously introduced in FIG. 1 are numbered similarly and not re-introduced here for reasons of brevity. Embodiment 200 depicts the second branch of the air intake system of engine 10 and includes intake passages 144 and 148 along with turbocharger 130. First PCV conduit 252 (e.g., push-side pipe) is shown coupling crankcase 255 to the second branch 144 of the intake passage.

PCV hydrocarbons may be directed to intake manifold 160 via either the first PCV conduit 252 (also termed, boost side PCV conduit 252) or the second PCV conduit 254 (also termed, vacuum side PCV conduit 254) based on engine operating conditions. Specifically, blow-by gases from engine cylinders 14 flow past piston rings and enter crankcase 255. During conditions when turbocharger 130 is operated to provide a boosted aircharge to the intake manifold, the elevated pressure in the intake manifold causes one-way valve 256 in vacuum side PCV conduit 254 to close. As a result, during boosted engine operation, PCV gases flow in a first direction (arrow 264) and are received in the engine intake upstream of the intake oxygen sensor 172. Specifically, PCV air is directed into the second branch 144 of intake passage, downstream of air filter 156, and upstream of charge air cooler 154 via boost side PCV conduit 252 (or push-side pipe). The PCV flow may be directed to the intake passage upon passage through a boost side oil separator 260. The boost side oil separator may be integrated into the cam cover or may be an external component. Thus, during boosted conditions, the PCV gases are introduced upstream of intake oxygen sensor 172 and therefore do affect the output of intake oxygen sensor 172. The boosted conditions may include intake manifold pressure above ambient pressure.

In comparison, during conditions when engine 10 is operated without boost, elevated vacuum in the intake manifold causes one-way valve 256 in the vacuum side PCV conduit 254 (or pull-side pipe) to open. As a result, during non-boosted engine operation, PCV gases flow in a second direction (arrow 262) different from the first direction and are received in the engine intake downstream of the intake oxygen sensor 172. In the depicted example, the second direction of PCV flow during non-boosted engine operation is opposite of the first direction of PCV flow during boosted engine operation (compare arrows 262 and 264). Specifically, during non-boosted operation, PCV air is directed into the intake manifold 160, directly, downstream of throttle 158 via the vacuum side PCV conduit 254. The PCV flow may be directed to the intake manifold 160 upon passage through a vacuum side oil separator 258. Herein, the PCV air is introduced downstream of intake oxygen sensor 168, and therefore does not affect the output of oxygen sensor 172. Thus, due to the specific engine configuration, during boosted engine operation, PCV hydrocarbons are ingested into the engine intake manifold upstream of the intake oxygen sensor 172 and are ingested into the engine intake manifold downstream of the intake oxygen sensor 172 during non-boosted conditions.

The present disclosure describes methods to reduce engine oil dilution when engine oil temperature (and engine temperature) is below a temperature threshold. Engine oil may be diluted with liquid fuel as a result of fuel accumulation in the engine oil in the crankcase of the engine. During engine cold start and warm-up conditions fuel may collect in the engine oil. Then, when the engine oil is warming up and/or after the engine oil has warmed up to a steady-state operating temperature, the accumulated fuel may evaporate and then get released as hydrocarbons into the air and PCV flow.

One example method to lower engine oil dilution prior to engine warm-up may include adjusting a position of the AIS throttle 115 in intake passage 140, wherein the adjustment comprises moving the AIS throttle 115 to a more closed position. However, this adjustment to the AIS throttle 115 may only be performed when engine oil dilution is above a first threshold and engine oil temperature is below the temperature threshold. Thus, the adjustment to the position of AIS throttle 115 may not be implemented if engine oil dilution is lower than the first threshold. The adjustment in position of the AIS throttle 115 may also not be performed when engine oil temperature is higher than the temperature threshold. In the depicted embodiment 200, engine oil temperature may be measured by temperature sensor 272 coupled to the crankcase 255. Alternatively, in other embodiments, engine oil temperature may be estimated from engine coolant temperature.

Engine oil dilution may be estimated in a variety of ways. In one example, oil dilution may be detected at engine idle conditions when engine oil temperature (EOT) is about 130-150° F. by monitoring injected quantities of fuel from fuel injectors. Components of fuel that boil at lower temperatures (also termed lighter ends of fuel) may evaporate at lower EOTs such as the temperatures mentioned above. Heavier ends of fuel may boil at higher temperatures and therefore, may not contribute to hydrocarbon concentration in the PCV air at EOTs between 130-150° F. As lighter ends of fuel in the form of vapors are received in the engine intake, fuel injected by the fuel injectors into engine cylinders may be trimmed to maintain stoichiometric combustion. Therefore, an amount of hydrocarbons received via PCV system may be determined based on a reduction to the fuel supplied by fuel injectors. As an example, when PCV flow does not include fuel vapors, fuel injectors may deliver 100% of the desired fuel to maintain stoichiometric combustion. However, if it is determined that 90% of the fuel for stoichiometric combustion is supplied by fuel injectors, it may be estimated that PCV flow (and engine oil dilution) is approximately 10%.

In another example, the intake oxygen sensor may be used to estimate engine oil dilution. As discussed earlier, when the engine is boosted, PCV flow may enter the engine intake upstream of the intake oxygen sensor 172. As a result, hydrocarbons in the PCV may affect the output of the intake oxygen sensor 172 enabling the intake air oxygen sensor 172 to measure engine oil dilution in the absence of EGR and purge. An amount of PCV hydrocarbons (or PCV flow) in the intake aircharge may be determined as a function of the amount of change in oxygen content due to the release of PCV air. As the amount of PCV hydrocarbons ingested into the engine intake manifold increases, such as when PCV is enabled or flowing from the push-side pipe (e.g., first PCV conduit 252) during boosted conditions, the hydrocarbons react with oxygen at the sensing element of the intake oxygen sensor. The oxygen is consumed, and water and carbon dioxide are released, and as a result, the estimated oxygen concentration is reduced. This reduction in oxygen concentration estimated by the intake oxygen sensor may be inferred as engine oil dilution.

It will be noted that if the PCV flow estimation is performed during conditions when purging from the fuel vapor canister and/or EGR is enabled, an output of the intake oxygen sensor 172 may be corrupted. Said another way, EGR and/or fuel vapor purge flow may cause an error in the output of the intake oxygen sensor. Thus, estimation of PCV flow, and engine oil dilution, from the intake oxygen sensor 172 may be performed only when EGR and purge flow are not enabled.

An instantaneous hydrocarbon concentration in the engine oil and fuel evaporation rate from the engine oil may be estimated based on one or more of engine oil temperature (EOT), an engine boosting condition, fuel composition (e.g., ethanol content of fuel used in the engine), compressor inlet pressure or crankcase pressure, and intake oxygen concentration measured from the intake oxygen sensor (e.g., such as the intake oxygen sensor 172 shown in FIGS. 1-2), or a model of any of or any combination of the above measurements. Specifically, the method of determining the instantaneous hydrocarbon concentration in engine oil and/or the fuel evaporation rate may include obtaining an intake oxygen sensor reading when EGR flow and purge flow are disabled and when the engine is boosted. The decrease in oxygen concentration measured at the intake oxygen sensor may thus be due to hydrocarbons from PCV flow alone and not due to additional diluents such as EGR flow and purge flow hydrocarbons.

The intake oxygen sensor reading may then be divided by an estimated vapor pressure to determine the instantaneous concentration of hydrocarbons in the engine oil. The vapor pressure may be based on the EOT and the fuel composition (e.g., the amount of heavy vs. light ends in the fuel). The fuel evaporation rate may then be determined based on a hydrocarbon concentration gradient between the liquid and gaseous phases. The hydrocarbon concentration in the liquid phase is the concentration of hydrocarbons in the engine oil and the hydrocarbon concentration in the gaseous phase is approximated by the intake oxygen measurement of the intake oxygen sensor. The instantaneous hydrocarbon concentration in engine oil and the fuel evaporation rate may be stored in a memory of the controller and then updated as subsequent intake oxygen sensor measurements are obtained. In yet another example, engine oil dilution may be based on air-fuel ratios sampled at various portions of an engine start and warm-up. In a further example, oil dilution may be based on a sensor measuring oil properties, such as oil viscosity.

Turning now to FIG. 3, it illustrates an example routine 300 for providing vacuum to a crankcase by adjusting a position of an AIS throttle. Specifically, the position of the AIS throttle may be changed based on a variety of engine conditions including, as mentioned earlier, an engine oil dilution being greater than a first threshold and an engine oil temperature being lower than a temperature threshold.

At 302, routine 300 may include estimating and/or measuring one or more engine operating conditions. Engine operating conditions may include an engine temperature, an engine speed, an engine load, boost, an injection timing and pressure, a duration of engine operation, an engine air-to-fuel ratio, etc. At 304, an initial AIS throttle position may be determined and set based on the estimated and/or measured engine conditions. For example, at a higher engine speed and higher torque demand, the initial position of the AIS throttle may be fully open. In another example, the AIS throttle may be adjusted to a more closed position if compressor surge conditions are indicated.

At 306, routine 300 may determine if engine oil dilution is higher than a first threshold, Threshold_EO. As explained earlier, engine oil dilution may be estimated from one or more of an output of the intake oxygen sensor (e.g. IAO2 172 of engine 10), commanded fuel injection quantities, and measurement of oil viscosity. The first threshold, Threshold_EO may, in one example, be 5% dilution. In another example, the first threshold may be 10%.

If it is determined that engine oil dilution is below Threshold_EO (or the first threshold), routine 300 continues to 312 to maintain the initial position of the AIS throttle and then ends. On the other hand, if it is established that engine oil dilution is greater than Threshold_EO, routine 300 proceeds to 308 to determine if engine oil temperature (EOT) is greater than a second threshold. The second threshold may be a temperature threshold, Threshold_T. In one example, the temperature threshold, Threshold_T, may be 175° F. In another example, the temperature threshold, Threshold_T, may be 210° F. If, at 308, it is confirmed that EOT is higher than the temperature threshold, Threshold_T, routine 300 progresses to 309 to confirm if the EOT has been over the temperature threshold, Threshold_T, for longer than a threshold time. Threshold time may be a duration threshold, Threshold_D. Accordingly, the controller may include a timer that will count the minutes, and thereby the duration, that EOT is above the temperature threshold. Fuel dissolved in engine oil may evaporate more easily from the engine oil after EOT surpasses the temperature threshold, Threshold_T, for a considerable amount of time because of higher vapor pressures due to higher oil temperatures. In one example, threshold time may be a duration of 1 hour. In another example, the threshold time may be a duration of 90 minutes.

If it is determined at 309 that EOT has been higher than the temperature threshold for longer than the threshold time, Threshold_D, routine 300 proceeds to 312 to maintain the initial position of the AIS throttle and then ends. Thus, the AIS throttle position may not be altered if either engine oil dilution is lower than the first threshold (Threshold_EO) or engine oil temperature is higher than the temperature threshold (Threshold_T) for longer than the threshold time (Threshold_D).

If, at 308, EOT is determined to be less than the temperature threshold, Threshold_T, routine 300 continues to 310. Further, if at 309 EOT is determined to be greater than the temperature threshold but for less than the threshold time, Threshold_D, routine 300 continues to 310 to assess whether engine conditions permit a change in position of the AIS throttle. In particular, it may be determined if the engine conditions permit a change in the AIS throttle position towards a more closed position where intake airflow to the engine is reduced. As such, there may be engine conditions where changes in AIS throttle position may be tolerated without affecting engine performance. In addition, there may be conditions where the throttle position is limited or constrained. For example, if a vehicle is accelerating and engine torque demand is higher, the initial setting for the AIS throttle may be a mostly open or fully open position enabling a higher airflow. In this situation, the AIS throttle position may not be moved to a more closed position as it would adversely affect engine torque output and performance. In such conditions, the AIS throttle position may be maintained, and not altered. Therefore, if it is determined at 310 that engine conditions may not allow adjustments to AIS throttle position, routine 300 proceeds to 312 and maintains the initial setting of the AIS throttle and routine 300 then ends.

However, if it is assessed, at 310, that engine conditions permit a change in AIS throttle position, and more specifically the conditions permit a decrease in an opening of the AIS throttle, the AIS throttle may be moved towards a more closed position than the initial position, at 314, to generate a vacuum. In one example, the AIS throttle may be adjusted from a mostly open position to a mostly closed position. In another example, the AIS throttle may be transitioned from a fully open position to a mostly closed position. In yet another example, the AIS throttle may be moved from a fully open position to a fully closed position. Further, an amount of closing of the AIS throttle may be determined by a level of engine oil dilution. Thus, in one example, the controller may decide to fully close the AIS throttle if engine oil dilution levels are significantly higher than the first threshold. In another example, the AIS throttle may be moved to a mostly closed position if engine oil dilution is slightly above the first threshold.

By moving the AIS throttle to a more closed position, a pressure differential may be created between an inlet of a compressor (e.g. compressor 132 of FIG. 1) and a push-side pipe or boost side PCV conduit (e.g. first PCV conduit 252). Further, a reduced pressure (or vacuum) may be generated in the intake passage (e.g. second branch 144 of intake passage 140) which may be provided to the crankcase, at 316, via boost side PCV conduit.

As such, by reducing pressure within the crankcase, a pressure of gas (e.g. air) above the engine oil in the crankcase is also reduced which decreases the boiling point of hydrocarbons within the fuel. Thus, highly volatile fuel compounds may be removed by boiling at lower engine oil temperatures. Further, decreasing the total pressure of the gas may provide a higher driving force for fuel evaporation.

An added advantage of providing vacuum to the crankcase may be that fuel vapors in a headspace of the crankcase may be purged into the intake passage more rapidly. Further, by removing fuel vapors from the headspace, additional fuel diluted within the engine oil may evaporate and be flushed out by the vacuum.

At 318, fuel vapors purged from the crankcase may be received in the intake passage upstream of the compressor(s) via the push-side pipe or boost side PCV conduit. Next, at 320, one or both of fuel injection amount and injection timing may be adjusted based on a quantity of fuel vapors received in the intake from the PCV, and existing airflow. In one example, the fuel injection amount and/or timing may be adjusted to maintain a cylinder air-fuel ratio at or close to a desired ratio, such as stoichiometry. For example, fuel injection amount may be decreased in response to an increase in fuel vapors received from the crankcase. In another example, fuel injection amount and/or timing may be modified to maintain engine combustion for torque. In yet another example, one or both of fuel injection timing and fuel injection amount may be varied to maintain each of engine torque and a stoichiometric air-fuel ratio. Further, in response to the change in AIS throttle position, an EGR valve position may be adjusted to maintain a target delta pressure between compressor inlet pressure and exhaust pressure to enable EGR valve robust operation.

Thus, a sensor may determine an air-fuel ratio of exhaust gases exiting the engine and the determined air-fuel ratio may be compared with a desired air-fuel ratio. The controller may calculate an error based on a difference between the desired air-fuel ratio and the determined air-fuel ratio. Fuel injection from fuel injectors may, accordingly, be adjusted based on the calculated error.

At 322, routine 300 may assess whether pressure in the crankcase is lower than or equal to a third threshold. The third threshold may be a pressure threshold, Threshold_P. In one example, pressure in the crankcase may be measured by a pressure sensor. As such, oil seals in the crankcase may be compromised if they are exposed to lower pressures. In one example, the controller may limit pressure in the intake passage to a pressure threshold of –8 kPa gage pressure as determined at the compressor inlet. In another example, pressure threshold may be limited to –5 kPa gage pressure. Therefore, an amount of vacuum provided to the crankcase may be based on maintaining durability of these oil seals. It will be appreciated that alternate embodiments may include a different pressure threshold. As an example, oil seals in crankcases of diesel engines may withstand a pressure range of –20 kPa to +5 kPa gage pressure.

If it is determined at 322 that the pressure in the crankcase is lower than or equal to the pressure threshold, Threshold_P, routine 300 continues to 326 to adjust the position of the AIS throttle to a more open position relative to the position of the AIS throttle at 314. Specifically, an opening of the AIS throttle may be increased to decrease vacuum generation and enable an increase in pressure in the intake passage and consequently, the crankcase. In one example, the AIS throttle may be adjusted to a more open position from a more closed position. In another example, the AIS throttle may be transitioned to a fully open position from a fully closed position. In yet another example, the AIS throttle may be changed from a mostly closed position to a fully open position.

The position that the AIS throttle is adjusted to at 326 may be determined by the level of pressure in the crankcase and current engine oil dilution. For example, if the pressure in the crankcase is marginally higher than Threshold_P but engine oil dilution remains above Threshold_EO, the AIS throttle may be opened slightly relative to its position at 314. This position may increase pressure in the crankcase to higher than the threshold pressure yet the pressure in the crankcase may be low enough to facilitate continued fuel vapor evaporation by reducing the boiling point of compounds within the fuel. Herein, routine 300 may continue to 324.

Optionally, the providing of vacuum to the crankcase may be discontinued and the AIS throttle may be returned to its initial position of 304 and routine 300 may end, as shown by the dashed arrow. In another example, the AIS throttle may be adjusted to a fully open position from the mostly closed position before routine 300 ends. The AIS position at 326 may also depend on existing engine conditions. For example, vacuum provision to the crankcase may be disabled if pressure in the crankcase has reached Threshold_P and engine oil dilution has reduced to Threshold_EO. In another example, the controller may terminate providing vacuum to the crankcase based on a duration of vacuum provision. For example, if vacuum has been applied to the crankcase for 5 minutes, routine 300 may increase the opening of the AIS throttle and end. In another example, the controller may cease vacuum provision at a duration shorter than 5 minutes. If it is determined at 322 that the pressure within the crankcase is higher than the pressure threshold, Threshold_P, routine 300 progresses to 324 to determine if there is a change in engine operation conditions. Specifically, a desired engine performance may not be met with the existing vacuum conditions in the intake passage. In one example, engine torque demand may increase along with a demand for higher boost. Therefore, a higher airflow may be desired. In response to this demand, the AIS throttle may be adjusted to a more open position from a more closed position, and the application of vacuum to the crankcase may be terminated. Thus, if it is determined at 324 that engine operating conditions have changed, routine 300 continues to 332 to modify the position of the AIS throttle to a more open position. In one example, the AIS throttle may be moved to a fully open position from a mostly closed position.

It will be appreciated that the adjustment to the AIS throttle position may be based on an extent of change in engine operating conditions. For example, if the torque and boost demand is considerable, the AIS throttle may be adjusted to a fully open position and vacuum generation may be disabled. In another example, if the increase in torque and boost demand is marginal, the AIS throttle may be adjusted such that it allows sufficient airflow for the desired torque yet produces an amount of vacuum that can be delivered to the crankcase for improving fuel vapor evaporation.

Conversely, if it is determined at 324 that there is no change in engine operating conditions, routine 300 proceeds to 328 to determine if EOT has increased above the temperature threshold, Threshold_T, and has remained above the temperature threshold for longer than the threshold time, Threshold_D. If the EOT is higher than the temperature threshold for longer than the threshold time, fuel diluted in engine oil may evaporate easily without enabling a lowering of pressure in the crankcase. If yes, routine 300 continues to 332 where the AIS throttle may be moved to a more open position relative to the position of the AIS throttle at 314. As an example, the AIS throttle may be transitioned to a fully open position from a mostly closed position. In another example, the AIS throttle may be adjusted to a mostly open position from a mostly closed position. In yet another example, the AIS throttle may be moved to a position based only on the existing engine operating conditions. Further, vacuum generation and the providing of vacuum to the crankcase may be discontinued.

However, if it is determined at 328 that EOT remains below the temperature threshold, Threshold_T or that EOT is greater than the temperature threshold but for a shorter duration than Threshold_D, routine 300 proceeds to 330 to confirm if engine oil dilution has decreased below the first threshold, Threshold_EO. In one example, engine oil dilution may have decreased to 3%, below an example Threshold_EO of 5%, after delivering vacuum to the crankcase in 316. If engine oil dilution is below the first threshold, Threshold_EO, routine 300 progresses to 332 where the AIS throttle may be adjusted to a more open position from the mostly closed position of 314. By doing so, vacuum generation may be discontinued and therefore, vacuum may not be applied to the crankcase.

On the other hand, if it is determined that engine oil dilution remains above the first threshold, Threshold_EO, routine 300 continues to 334 to maintain the position of the AIS throttle in a mostly closed position. Accordingly, vacuum may continue to be generated and may be provided to the crankcase to accelerate fuel evaporation. Routine 300 then ends.

It will be appreciated that the above method to extract fuel vapors diluted within engine oil may be used during boosted conditions when the compressor(s) are operational. When the engine is non-boosted, the AIS throttle may continue to create vacuum in the crankcase. However, the engine oil dilution amount may not be updated on a regular basis since the IAO2 sensor reading is not possible when there is no flow in the PCV push side port. Vacuum may be provided to the crankcase until the next opportunity for accurate IAO2 measurement exists. Then the engine oil dilution reading may be estimated and updated at 330 and routine 300 may continue thereon.

It will also be appreciated that though not specified above, the providing of vacuum to the crankcase may be deactivated if PCV flow received from the crankcase significantly affects closed-loop air-fuel ratio control.

In this way, evaporation of fuel from engine oil may be facilitated without engine oil warm-up. The AIS throttle in the intake passage may be adjusted to a more closed position only when engine oil dilution is greater than a first threshold and engine oil temperature is lower than a temperature threshold. If the engine oil temperature is greater than the temperature threshold for a duration shorter than a threshold duration, the AIS throttle may nevertheless be adjusted to a more closed position. However, if engine operating conditions demand a higher airflow, the AIS throttle may not be closed. If all the above conditions are met, an opening of the AIS throttle may be decreased and vacuum may be generated in the intake passage by throttling of airflow. This vacuum may be applied to the crankcase and fuel evaporation may be accelerated by lowering the boiling point of hydrocarbons in diluted fuel for a given engine oil temperature. The vacuum may also draw the evaporated fuel vapors from the crankcase.

Vacuum generation may be deactivated when pressure in the crankcase falls below a pressure threshold. The pressure threshold may protect oil seals in the crankcase from degradation. Alternatively, if the pressure threshold is reached, the amount of vacuum generated may be reduced, and not terminated, by opening the AIS throttle slightly relative to the more closed position. The generation of vacuum may also be aborted if engine operating conditions undergo a change, e.g. an increase in torque demand. Herein, the opening of the AIS throttle may be increased as demanded by the engine condition. Further, if engine oil temperature rises above the temperature threshold and stays above the temperature threshold for a substantial duration, or if engine oil dilution decreases below the first threshold, vacuum generation and application to the crankcase may be ended.

Thus, an example system may include an engine with an intake passage, a turbocharger with an intake compressor, an air induction system (AIS) throttle positioned in the intake passage upstream of the compressor, a crankcase, and a controller with computer readable instructions stored in non-transitory memory for, during a first condition, decreasing an opening of the AIS throttle to reduce pressure in the intake passage, and applying the reduced pressure to the crankcase to enhance fuel evaporation, and during a second condition, increasing the opening of the AIS throttle, and disabling the applying of reduced pressure to the crankcase. Herein, during the second condition, the applying of reduced pressure to the crankcase may be terminated. The first condition may include engine oil dilution being greater than a first threshold, and engine oil temperature being lower than a second threshold. The first condition may also include engine oil temperature being higher than the second threshold for a duration shorter than a threshold duration (e.g. Threshold_D). Further, during the first condition, the opening of the AIS throttle may be decreased from an initial more open position. As such, the AIS throttle may be moved to a more closed position from the initial more open position.

The second condition may comprise one or more of engine oil dilution being lower than the first threshold, engine oil temperature being greater than the second threshold (e.g. temperature threshold, Threshold_T of routine 300) for a duration longer than a threshold duration or threshold time (Threshold_D of routine 300), and a level of pressure in the crankcase being lower than a third threshold (e.g. pressure threshold, Threshold_P of FIG. 3). Further, during the second condition, the opening of the AIS throttle may be increased relative to the decreased opening in the first condition. As an example, the AIS throttle may be moved from a more closed position (in the first condition) to a more open position.

The controller may include further instructions for adjusting one or more of fuel injection amount and injection timing in response to receiving fuel vapors from the crankcase. Further, the fuel vapors from the crankcase may be drawn into the intake passage via a push-side pipe (e.g. first PCV conduit 252 or boost side PCV conduit 252 of FIGS. 1 and 2).

Further, an example method for a boosted engine may comprise, when engine oil dilution is higher than a first threshold and engine oil temperature is below a temperature threshold, adjusting a position of an air induction system (AIS) throttle, generating a vacuum, and applying the vacuum to a crankcase to enhance fuel evaporation from engine oil. In one example, the adjusting may be responsive to a determination that a determined engine oil dilution estimate in the control system based on sensed information is higher than a first threshold and a sensed engine oil temperature is below a temperature threshold. The adjusting of the AIS throttle may include adjusting the AIS throttle to a more closed position. Further, the applying of vacuum may be disabled when engine oil dilution is lower than the first threshold, and when engine oil temperature is higher than the temperature threshold. The method may further comprise adjusting the position of the AIS throttle responsive to a change in an engine operating parameter, wherein the engine operating parameter is engine torque, and wherein the position of the AIS throttle is adjusted to a more open position in response to an increase in engine torque. The generation and the applying of vacuum may be disabled in response to a level of pressure in crankcase decreasing below a pressure threshold (e.g. Threshold_P of FIG. 3). Herein, vacuum generation and provision to the crankcase may be terminated in response to crankcase pressure reducing below the pressure threshold. The method may further comprise adjusting one or more of a fuel injection amount and fuel injection timing based on fuel vapors received from the crankcase to maintain engine combustion at or around stoichiometry. Herein, the fuel injection amount may be decreased in response to an increase in fuel vapors received from the crankcase. Further, engine oil dilution may be detected via an intake oxygen sensor, e.g. IAO2 sensor 172 of FIGS. 1 and 2.

Turning now to FIG. 4, it depicts an engine operation map 400 illustrating an example adjustment to the position of the AIS throttle for reducing engine oil dilution. Map 400 shows low pressure exhaust gas recirculation (LP-EGR) flow at plot 402, AIS throttle position at plot 404, engine oil dilution at plot 406, engine oil temperature (EOT) at plot 408, pressure levels in the crankcase at plot 410, engine torque at plot 412, and engine speed at plot 414. All the above are plotted against time on the X-axis and time increases from the left of the X-axis to the right. Line 405 represents the first threshold (e.g. Threshold_EO) for engine oil dilution, line 407 represents the temperature threshold (e.g. Threshold_T) for EOT, and line

409 represents the pressure threshold (e.g. Threshold_P) for pressure in the crankcase. Thus, line 405 represents an oil dilution threshold to activate the closure of the AIS throttle (when other conditions are met). Line 407 represents an EOT threshold above which the AIS throttle closure for engine oil dilution reduction may not be activated. Line 409 represents the pressure threshold that the oil seals in the crankcase can be exposed to without degradation. Crankcase pressures lower than the pressure threshold may cause degradation of the oil seals.

Between t0 and t1, the engine may be at idle, and both engine speed and torque demand may be lower. As an example, the engine may have experienced a cold start and may be idling before the vehicle is set moving. EOT may be considerably lower than the temperature threshold (line 407) and engine oil dilution may be higher than the first threshold (line 405). Accordingly, the AIS throttle may be adjusted towards a more closed position to generate vacuum, which may be provided to a crankcase. As airflow may be nominal during idling conditions and the quantity of air entering the intake passage may be smaller, a lower amount of vacuum may be generated. In other words, pressure in the crankcase may decrease only by a smaller amount between t0 and t1. The reduction in crankcase pressure may lower the boiling point of the fuel enabling evaporation of the fuel from the oil at the current EOT. Thus, engine oil dilution may reduce slightly as shown by plot 406 between t0 and t1. It will be noted that at idle, LP-EGR may be disabled by closing an EGR valve and EGR may not flow between t0 and t1.

At t1, engine torque output may rise and engine speed may increase. For example, a vehicle operator may accelerate the vehicle rapidly and therefore, torque demand may be sharply increased. In response to the increased torque demand, the AIS throttle is adjusted to a fully open position allowing a higher airflow to enter the intake. Thus, in response to the change in an engine parameter (e.g. engine torque), the generation (and application) of vacuum via closing the AIS throttle may be deactivated. As such, during wide open throttle conditions, LP-EGR flow may be blocked by closing the EGR valve.

Between t1 and t2, engine torque and engine speed rise, and then settle down to a medium level. As an example, the vehicle may be accelerated initially when merging with freeway traffic and later, the vehicle may be at cruising speeds on the freeway. Herein, the AIS throttle may be transitioned from the fully open position at t1 to a mostly open position by t2. The pressure in the crankcase may increase as the AIS throttle is opened (plot 410) and the EGR valve may be opened to enable LP-EGR flow towards the latter portion of time between t1 and t2, e.g. during cruising conditions. As will be observed, oil dilution may increase between t1 and t2. In one example, fuel dilution in oil may increase due to colder climates or cool ambient conditions. In another example, richer combustion may also enhance engine oil dilution. EOT may increase slowly but may not reach the temperature threshold (line 407) between t1 and t2.

At t2, since torque demand and engine speed are lower and steady, and engine oil dilution is considerably higher than the first threshold (line 405), the AIS throttle may be adjusted again to a more closed position. As shown, the AIS throttle may be moved towards (or near) the fully closed position, and a higher amount of vacuum may be generated. Closing the AIS throttle may enable a higher flow of LP-EGR by increasing the pressure drop in the LP-EGR system. As will be observed, engine oil dilution may decrease at a faster rate between t2 and t3 as the higher amount of vacuum may be provided to the crankcase.

At t3, pressure within the crankcase may fall to the threshold pressure (line 409) and further reduction in pressure may degrade oil seals. In response to pressure in the crankcase reducing to the pressure threshold, the AIS throttle may be adjusted to a more open position. As such, LP-EGR flow may be slightly reduced as the opening of AIS throttle is increased. In the depicted example, the AIS throttle is adjusted from a substantially fully closed position to a relatively more open position. Specifically, the AIS throttle may be mostly closed instead of being nearly fully closed. As will be observed, engine oil dilution at t3 remains higher than the first threshold (line 405) and therefore, providing of vacuum to the crankcase may not be terminated.

In an alternate example, if engine oil dilution is substantially at the first threshold, the AIS throttle may be changed to a mostly open or fully open position from the nearly fully closed position. Consequently, vacuum generation and crankcase pressure reduction may be terminated.

Between t3 and t4, engine torque and speed may remain at moderate levels, LP-EGR flow may be at medium level, and the AIS throttle may be retained at its mostly closed position for generating vacuum. Further, pressure within the crankcase may remain above the pressure threshold yet may be low enough for promoting fuel evaporation from the engine oil. Therefore, engine oil dilution may reduce at a steady pace between t3 and t4.

At t4, EOT reaches the temperature threshold (line 407). At t5, EOT has remained above the temperature threshold for a duration of Thresh_D. In response to EOT remaining above the temperature threshold for the threshold duration, Thresh_D, the AIS throttle may be moved to a mostly open position and vacuum generation may be terminated. Beyond t5, the decrease in engine oil dilution is because of fuel evaporating at its boiling point (and not at a lower boiling point produced by lowering crankcase pressure).

Thus, a method for a boosted engine may comprise, when engine oil temperature is lower than a first threshold, decreasing an opening of an air induction system (AIS) throttle if an engine oil dilution is greater than a second threshold, and increasing the opening of the AIS throttle responsive to a change in an engine operating parameter. The engine operating parameter may be engine torque, and the opening of the AIS throttle may be increased in response to an increase in engine torque (as shown at time t2 in map 400). The method may further comprise increasing the opening of the AIS throttle responsive to an increase in engine oil temperature above the first threshold (as at time t5 in map 400) for a duration longer than the threshold duration (as at time t5 in map 400). Further, the method may also comprise opening the AIS throttle responsive to engine oil dilution decreasing below the second threshold.

In this way, engine oil dilution may be reduced when engines experience shorter drive cycles or function in colder climates. Vacuum may be generated by throttling intake airflow via adjusting an AIS throttle to a substantially closed position. The opening of the AIS throttle may be decreased only at suitable engine operating conditions to maintain drivability and engine performance. By providing the vacuum to a crankcase, pressure within the crankcase may be reduced enabling evaporation of fuel at lower temperatures (as their boiling points are reduced at lower crankcase pressure). Thus, engine oil dilution may be decreased without completing engine warm-up. By reducing engine oil dilution, engine oil viscosity may be maintained at a desired viscosity level for engine lubrication and reducing wear. Overall, engine oil quality may be maintained for a longer duration, and engine durability may be improved.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
an engine with an intake passage;
a turbocharger with an intake compressor;
an air induction system (AIS) throttle positioned in the intake passage upstream of the intake compressor;
a crankcase; and
a controller with computer readable instructions stored in non-transitory memory for:
during a first condition,
decreasing an opening of the AIS throttle to reduce pressure in the intake passage; and
applying the reduced pressure to the crankcase to enhance fuel evaporation; and during a second condition,
increasing the opening of the AIS throttle; and
disabling the applying of reduced pressure to the crankcase.

2. The system of claim 1, wherein the first condition includes engine oil dilution being greater than a first threshold, and engine oil temperature being lower than a second threshold.

3. The system of claim 2, wherein the second condition includes one or more of engine oil dilution being lower than the first threshold, engine oil temperature being greater than the second threshold for a duration longer than a threshold duration, and a level of pressure in the crankcase being lower than a third threshold.

4. The system of claim 1, wherein the controller includes further instructions for adjusting one or more of fuel injection amount and injection timing in response to receiving fuel vapors from the crankcase.

5. The system of claim 1, wherein fuel vapors from crankcase are delivered to the intake passage via a push port.

6. A method for a boosted engine comprising:
when engine oil dilution is higher than a first threshold and engine oil temperature is below a temperature threshold, adjusting a position of an air induction system (AIS) throttle;
generating a vacuum; and
applying the vacuum to a crankcase to enhance fuel evaporation from engine oil.

7. The method of claim 6, wherein the adjusting includes adjusting the AIS throttle to a more closed position.

8. The method of claim 7, wherein the applying of vacuum is disabled when engine oil dilution is lower than the first threshold.

9. The method of claim 8, wherein the applying of vacuum is disabled when engine oil temperature is higher than the temperature threshold.

10. The method of claim 9, further comprising adjusting the position of the AIS throttle responsive to a change in an engine operating parameter.

11. The method of claim 10, wherein the engine operating parameter is engine torque.

12. The method of claim 11, wherein the position of the AIS throttle is adjusted to a more open position in response to an increase in engine torque.

13. The method of claim 9, wherein the applying of vacuum is disabled in response to a level of pressure in crankcase decreasing below a pressure threshold.

14. The method of claim 6, further comprising adjusting one or more of a fuel injection amount and fuel injection timing based on fuel vapors received from the crankcase to maintain engine combustion at or around stoichiometry.

15. The method of claim 14, wherein the fuel injection amount is decreased in response to an increase in fuel vapors received from the crankcase.

16. The method of claim 6, wherein engine oil dilution is detected via an intake oxygen sensor.

17. A method for a boosted engine, comprising:
when engine oil temperature is lower than a first threshold, decreasing an opening of an air induction system (AIS) throttle if an engine oil dilution is greater than a second threshold; and
increasing the opening of the AIS throttle responsive to a change in an engine operating parameter.

18. The method of claim 17, wherein the engine operating parameter is engine torque, and wherein the opening of the AIS throttle is increased in response to an increase in engine torque.

19. The method of claim 17, further comprising increasing the opening of the AIS throttle responsive to an increase in engine oil temperature above the first threshold for a duration longer than a threshold duration.

20. The method of claim 17, further comprising opening the AIS throttle responsive to the engine oil dilution decreasing below the second threshold.

* * * * *